United States Patent [19]
Ferriera

[11] 4,281,515
[45] Aug. 4, 1981

[54] SOLAR POWERED COOLING DEVICE

[75] Inventor: Cress R. Ferriera, Stockton, Calif.

[73] Assignee: Energy Wise, Inc., Lodi, Calif.

[21] Appl. No.: 960,555

[22] Filed: Nov. 14, 1978

[51] Int. Cl.$^3$ .................. F25B 27/00; F25B 15/00
[52] U.S. Cl. ............................................. 62/2; 62/476
[58] Field of Search .......................... 62/2, 476, 271; 126/432, 443

[56] References Cited

U.S. PATENT DOCUMENTS

| | | | |
|---|---|---|---|
| 3,894,528 | 7/1975 | Stubblefield | 62/2 |
| 3,939,819 | 2/1976 | Minardi | 126/448 |
| 4,100,756 | 7/1978 | Albertson | 62/476 X |
| 4,146,013 | 3/1979 | Foulke | 62/2 |
| 4,164,125 | 8/1979 | Griffith | 62/2 |
| 4,165,952 | 8/1979 | Bennett | 62/2 |
| 4,171,620 | 10/1979 | Turner | 62/271 |
| 4,171,624 | 10/1979 | Meckler et al. | 62/271 |
| 4,178,989 | 12/1979 | Takeshita | 62/2 |
| 4,207,744 | 6/1980 | Takeshita et al. | 62/2 |

Primary Examiner—Lloyd L. King
Attorney, Agent, or Firm—Harvey B. Jacobson

[57] ABSTRACT

The system contains an unique solar collector for transferring heat energy from the sun to a solution comprising a two-phase refrigerant and a fluid absorbent. Solar radiation causes a vaporization of the refrigerant which exits from the solar panel through a separate path from the remainder of the fluid. The vaporized refrigerant is returned to a liquid state and passed through an evaporator in a lower pressure environment for producing a cooling effect. The refrigerant is recombined with the absorbent and returned to the solar collector in a high pressure environment.

Three modes of operation are included in the system. Continuous cooling being the first mode. The second mode consists of storing the liquid refrigerant after separation from the refrigerant absorbent fluid. The refrigerant and absorbent are stored for future use. The third mode of operation provides cooling in the absence of solar radiation by the use of the stored refrigerant and subsequent combination of the refrigerant with absorbent which fluid is then stored in a separate reservoir.

The system also is provided with a solar tracking arrangement by which one or more solar collectors will be automatically oriented directly toward the sun for assuring maximum utilization of the sun's energy.

10 Claims, 14 Drawing Figures

SOLAR POWERED COOLING DEVICE

BACKGROUND OF THE INVENTION

1. Field of the Invention

This invention relates to the field of solar powered absorption cooling systems.

2. Description of the Prior Art

It is known to utilize the heat produced in a conventional solar collector to transport power to the concentrators of certain prior art absorption refrigeration machines. In these known systems, heat is transported from the collector to the concentrator by means of a transfer fluid which forms a thermal conduit for heat flow from the solar heating system to the absorption refrigeration system.

Due to the inefficiencies inherent in the conduction heat transfer mechanism used in known solar absorption heating systems, it is often necessary to raise the temperature of the transfer fluid after it leaves the collector and before it enters the concentrator in order to insure that the temperature of the transfer fluid is above the minimum concentrator temperature at which conventional absorption cooling systems can function. Ordinary solar collectors cannot begin to activate an absorption refrigeration cycle in the forenoon until their transfer fluid temperature is substantially higher than the minimum operating temperature of the absorption cycle concentrator. The ordinary solar collector ceases to operate the absorption cycle in the evening whenever its transfer fluid temperature falls to near the minimum operating temperature of the absorption system concentrator.

SUMMARY OF THE INVENTION

An object of the present invention is to link high vacuum solar collectors with an unique absorption refrigeration cycle in a direct manner that allows the absorption cycle to operate during periods when the solar collector temperature is at or below the minimum concentrator temperature necessary for operation of a conventional absorption refrigeration system. In this manner, my absorption refrigeration system will begin operating earlier in the day and continue operating later in the evening when the solar energy available is insufficient to activate a conventional absorption refrigeration system.

A further object of the present invention is to provide a solar panel which allows the separation of the refrigerant from the absorbent of an absorbent cooling fluid upon the direct contact of the fluid with solar radiation. The solar panel allows separate exit paths for the refrigerant and absorbent fluid.

A still further object of the present invention is to produce a collector panel that is light in weight and sufficiently compact to allow it to be solar tracked by economically priced equipment.

Yet a still further object of the present invention is to provide a novel basic panel design for solar panels which does not depend on manufacturing techniques that might limit its size and shape. My collector panel may be manufactured in almost any size and shape. It can also be mounted in fixed position if this seems more architecturally pleasing or a plurality of collector panels may be mounted in tracking frames. The panel may also be used in place of ordinary building siding or applied directly to roof sheeting in place of conventional roofing material.

Yet another object of the present invention is to provide collector panels that may be piped together so that one or more may be used as a complete concentrator assembly by piping inlets for several collectors into a common inlet header pipe and outlets from several collectors into a common outlet header pipe.

Another object of the present invention is to provide a mounting structure which allows the collector panels to be tilted or rotated on a fixed support so that the face of the panel can always be maintained perpendicular to the incident rays of the sun.

A still further object of the present invention is to provide a mounting structure for solar panel collectors in which the fluid conduits and pipes may be concealed from view to enhance the over-all appearance of the collector panels.

Yet even a still further object of the present invention is to provide a solar radiation sensor which can provide an indication of the optimum panel orientation in order that the panel face may be maintained in a position perpendicular to the sun's rays.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Now with reference to the drawings, the solar power cooling system will be described in detail. With specific reference to FIGS. 1 through 3 of the drawings, the solar collector panel of the invention is set forth and generally referred to by the numeral 100. The solar collector panel comprises a hermetically sealed energy conversion unit 102 having an inlet pipe 104, a vapor outlet pipe 106 and a fluid outlet pipe 108 connected thereto. The conversion unit 102 is mounted for support in a frame generally designated at 110. The frame is covered by a transparent windshield 112 in the front and a flexible weather shield 114 about the sides and rear.

Figures 1, 2, 3:
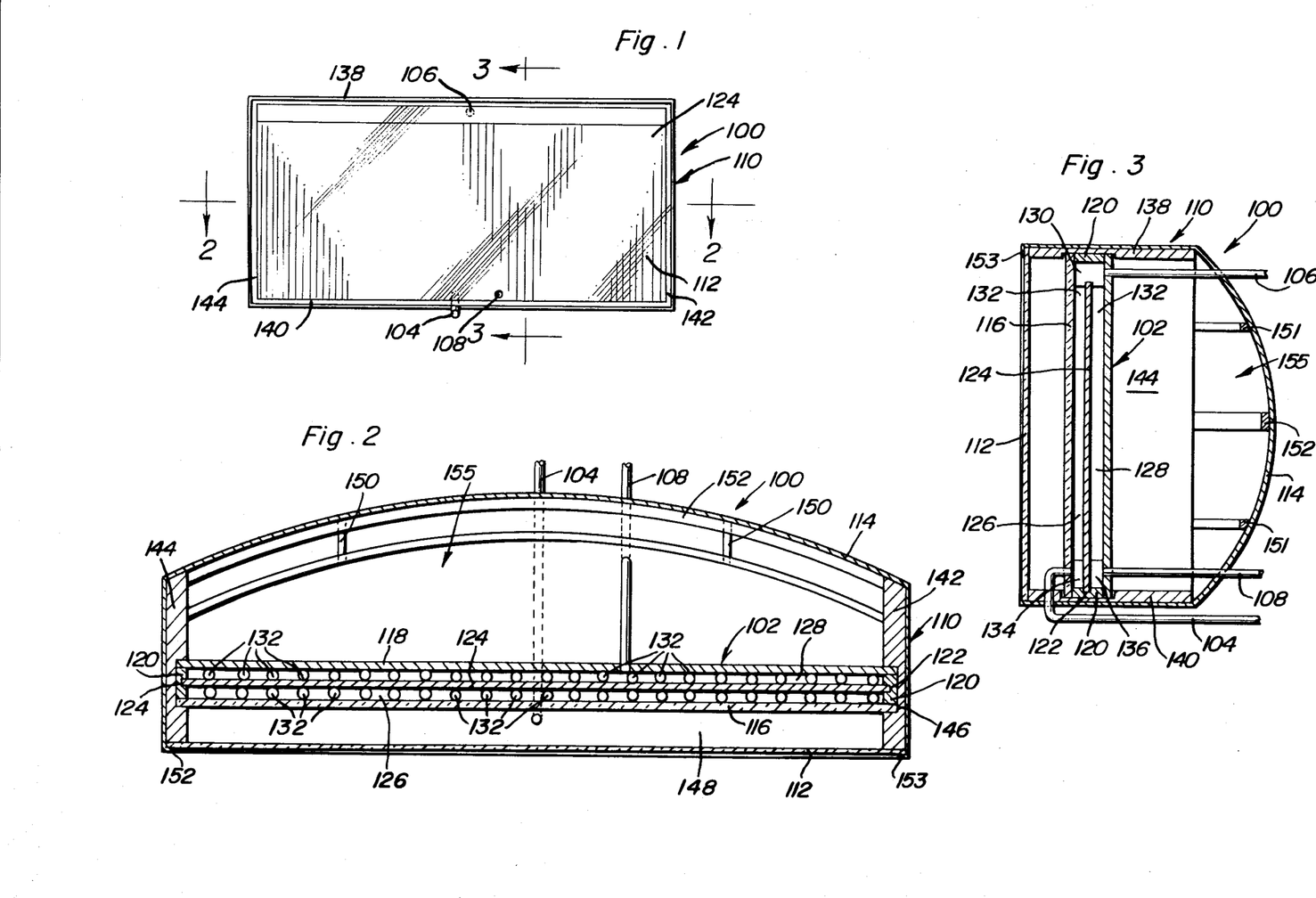
FIG. 1 is a front elevational view of a solar panel of the present invention.
FIG. 2 is a plan sectional view taken substantially along a plane passing through section line 2—2 of FIG. 1.
FIG. 3 is a side elevational sectional view substantially along a plane passing through section line 3—3 of FIG. 1.

Hermetically sealed conversion unit 102 constitutes the main working unit of the solar collector panel. The unit has an essentially rectangular facing panel 116 which may be made of glass, acrylic, or any other suitably rigid transparent material. The panel is preferably approximately ⅛ inch in thickness. It will be noted, however, that any suitable shape or thickness of transparent material may be used as desired. The rear of conversion unit 102 is enclosed by rear sealing panel 118 which has a similar shape to that of facing panel 116 and is coextensive with the facing panel and separated therefrom by the use of perimetric spacer 120. Rear seal panel 118 may be of any suitable nonporous material which would advantageously have a low heat conductivity. Facing panel 116, perimetric spacer 120 and the rear seal panel 118 are connected in an airtight arrangement by any suitable means, such as gluing, in order that the interior space of the conversion unit will be able to withstand subatmospheric pressures without leaking. Disposed in slot 122 of perimetric spacer 120 is a part partition 124, which extends from the bottom of conversion unit 102 to within approximately one inch of the top of unit 102, thereby dividing the interior of the unit into three areas. The three areas constitute a forward fluid space 126 defined by the area directly forward of partition 124, a rearward fluid space 128 defined by the area directly to the rear of the partition and a vapor separation area 130 defined as being the open area at the top of unit 102. Forward fluid space 126 has fluid inlet pipe 104 connected to the bottom thereof for allowing the entry of absorbent fluid containing a refrigerant and an absorber into the forward fluid space. The absorbent fluid rises to the top of partition 124, flows over the top in a waterfall manner and into rear fluid space 128. At the same time refrigerant vaporizes due to the molecular activity created in the fluid by solar radiation incident upon the fluid. The vapor rises into area 130 and exits through pipe 106. Meanwhile, the remainder of the fluid exits through pipe 108. Fluid guide rods 132 are disposed in spaces 126 and 128 and form paths through which the fluid may flow. Each guide rod may be a circular plastic rod of approximately ⅛ inch diameter. The guides in forward space 126 are connected to partition 124 and facing panel 116. The rods extend from the top of partition 124 to a position approximately one inch above the bottom of partition 124 thus defining a distribution channel 134 which extends along the bottom of conversion unit 120 below each of the rods. In like manner, the rods in rear space 128 are positioned vertically within the space and extend from the top of partition 124 to approximately one inch above the bottom of partition 124 thus defining a return channel 136. Rods 132 are preferably spaced on approximately ⅜ inch centers with rods 132 of the forward space aligned with rods 132 of the rear space.

Structural support and rigidity is given to the solar collector panel by frame 110. The frame consists of top side walls 138 and bottom side walls 140, together with left and right side walls 142 and 144. These side walls form a continuous supporting structure for the conversion unit. A groove 146 is cut in the side wall structure and the conversion unit 120 is supported in the groove. In this manner, protection is provided for the conversion unit 102. Windshield 112, being of a transparent plastic film, is stretched across the forward part of frame 110 and attached to the four side walls, thereby forming a dead air space 148 between the windshield and facing panel 116. Frame 110 also includes vertical braces 150 which are attached to the top and bottom side walls. Horizontal braces 151 and 152 are attached to the left and right side walls. These braces give structural rigidity to the frame and provide a form over which weather shield 114 will be applied. Weather shield 114 may be a treated canvas, plastic film, fiberglass or other similar material. The shield covers the back and sides of the entire assembly and has a lip 153 which extends over windshield 112 and to which it is sealed so that the entire panel is weathertight. Inlet pipe 104 and outlet pipes 106 and 108 protrude through the weather shield and are sealed to it around their outside diameters. The cavity formed to the rear of conversion unit 102 and defined by the four side walls of the frame and the rear portion of the weather shield 114, and generally designated as numeral 155, may be filled with insulation, such as urethane foam or spun fiberglass in order to reduce energy losses from the solar collector panel.

Figure 9:
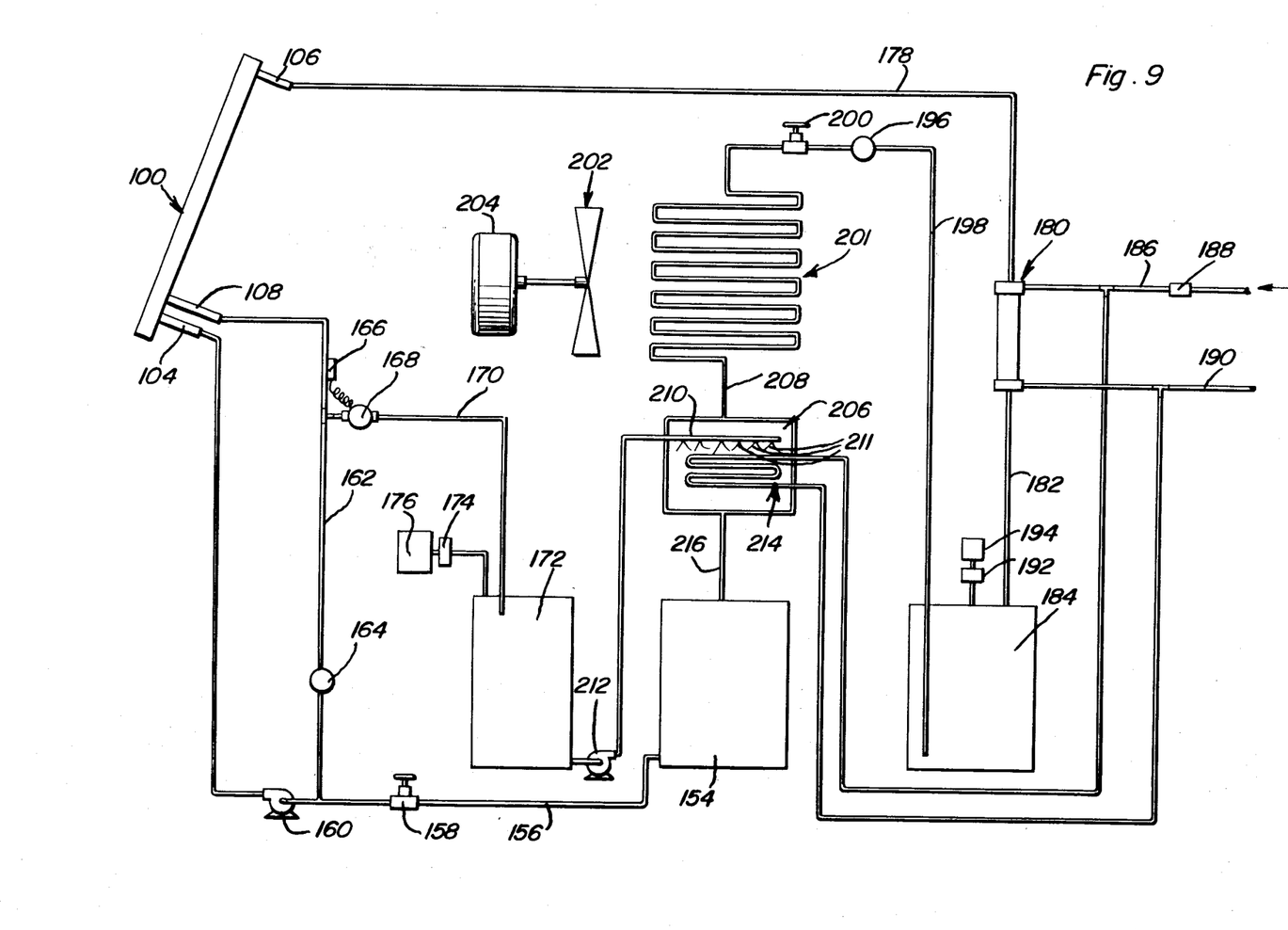
FIG. 9 is a schematic representation of absorption cooling system of the present invention.

Now with reference to FIG. 9, the operation of the absorption cooler of which the solar panel is a component will be clearly set forth in detail. Absorbent solution reservoir 154 contains the absorbent solution which may be, for example, a solution of distilled water and lithium bromide in the proportion of 51% lithium bromide and 49% water by weight. The solution should also contain a sufficient quantity of powered carbon or other dye mixed with it to color it black. As will be apparent to those skilled in the art, the distilled water acts as the refrigerant of the system while the lithium bromide constitutes the fluid absorber material. Output line 156 from the absorbent solution reservoir passes through valve 158 which controls the rate of flow of the absorbent solution. The absorbent solution is pumped by pump 160 into inlet pipe 104 of the solar collector panel 100. Solar radiation enters the absorbent solution through the windshield and transparent facing panel of the solar collector panel and increases the molecular activity of the absorbent solution such that a portion of the water content of the solution vaporizes into steam bubbles between the fluid guide rods 132. The steam bubbles ascend toward the top of the collector panel and exit through vapor outlet pipe 106, leaving a more concentrated solution of lithium bromide within the forward fluid space 126 of the conversion unit 102. This concentrated solution is lifted over the top of the partition 124 by the combined action of the solution pump 160 and the action of the ascending steam bubbles which tend to carry the concentrated solution with them. The concentrated solution of lithium bromide then flows over the partition and accumulates in rear fluid space 128 and exits through fluid outlet pipe 108.

The concentrated solution returns via pipe 162 to be repumped through pump 160. A pressure regulating valve 164 is inserted in return line 162 and is set to insure that the differential between the higher pressure side of the system within the solar collector panel and the lower pressure side of the system as within absorbent coolant reservoir 154 is maintained at, for example, 19.5 millimeters of mercury. Return line 162 also contains a temperature sensor 166. This sensor controls the action of valve 168 in line 170. When the temperature of the concentrated fluid reaches 123° F., the concentrate is usually 63% lithium bromide in water by weight, the concentrate having been sub-cooled about 45°, assuming the pressure within the sub-atmospheric high pressure portion of the system, within the solar collector panel, is 26 millimeters of mercury. At this concentration, the lithium bromide is returned through line 170 to concentrate storage reservoir 172 through the action of sensor 166 and the opening of valve 168. The pressure within concentrate storage reservoir 172 is maintained at approximately 7.5 millimeters of mercury by the action of vacuum pump 174 and pump motor 176, these elements also serving to expel contaminates from the system. This reservoir is also in the lower pressure side of the system. The portion of the absorbent solution which has been vaporized and removed from solar panel 100 through pipe 106 together with any concentrate returned to reservoir 172 is replaced automatically by fresh absorbent solution from absorbent solution reservoir 154 through manual flow control valve 158. Valve 158 is usually adjusted to a maximum flow rate of 61 pounds of absorbent fluid per hour per ton of system capacity. During start up and periods of less than maximum solar insolation, valve 158 flows less than the maximum flow rate to which it is set because of the concentrated absorbent fluid being returned to the inlet of solution pump 160 through pressure regulating valve 164. During periods of maximum solar insolation, valve 158 is usually flowing the maximum.

The water vapor which exits through pipe 106 travels through line 178 to condenser 180. The condensed water travels through lines 182 to refrigerant storage reservoir 184. Condenser 180 may be cooled by the use of city water, a well water supply, water from a water cooling tower, water from a lake or stream, or any other suitable source of cooling water. The cooling medium enters condenser 180 through inlet line 186 and inlet valve 188 and exits through line 190. Vacuum pump 192 and pump motor 194 are connected to refrigerant storage reservoir and maintain the pressure within that reservoir at approximately 26 millimeters mercury while the system is operating. The vacuum pump also serves to expel air and other non-condensable gases from the high side of the system.

Water to be used as a refrigerant is made available to solenoid valve 196 through refrigerant line 198. A hand operated expansion valve 200 is connected in the line and is manually set to flow approximately 12 pounds of water per hour per ton of system capacity. When comfort cooling is required, solenoid 196 is opened, the refrigerant water flows into evaporator 201 in which it is vaporized, absorbing heat from the controlled medium passing through the evaporator. The controlled medium may be an air stream driven by fan 202 and motor 204. The vaporized refrigerant is supplied to absorption chamber 206 through line 208. Also contained within absorption chamber 206 is spray header 210 containing spray nozzles 211. Header 210 is supplied with concentrated absorbent solution from reservoir 172 through spray pump 212 which is activated concurrently with solenoid valve 196 in order that both concentrated absorbent solution and water vapor will combine within absorption chamber 206. The temperature of the warm concentrated solution admitted from header 210 is lowered to a temperature of approximately 80° F. by cooling coil 214 which is supplied with circulating cooling water which enters from line 186 and exits through line 190. The concentrated absorbent solution, when lowered to 80° F., has a high affinity for water vapor, which is emitted from line 208. The diluted absorbent solution passes through line 216 and returns to absorbent solution reservoir 154. It will be noted by those skilled in the art that evaporator 201 and absorption chamber 206 are also on the low pressure side of the system.

The system has three modes of operation. When solar insolation is plentiful and comfort cooling is needed, solution pump 160 delivers approximately 51% lithium bromide solution from absorbent solution reservoir 154 to the collector panels with the flow rate being controlled by manually set valve 158 at about 61 pounds of solution per ton of system cooling capacity. The solar radiation disburses about one pound of water vapor per 1,000 BTUH of total system capacity leaving a solution of approximately 63% concentrated lithium bromide which is returned through valve 168 to reservoir 172. The spray pump 212 draws the concentrated lithium bromide solution from reservoir 172 and deposits it on cooling coils 214 at which time the concentrate absorbs the evaporated water vapor supplied through line 208. The recombined water vapor and concentrated solution provides the original absorber solution, having approximately 51%, lithium bromide to reservoir 154. The refrigerant vapor is condensed in condenser 180 and delivered to refrigerant storage tank 184. The liquid refrigerant is then delivered to evaporator 210 through which the medium to be cooled is past. The vaporized coolant is delivered to chamber 206 and recombined with the concentrated solution as discussed.

When solar insolation is available but comfort cooling is not needed, as in the typical morning hours of summer, the solution pump 160 delivers the absorbent solution to solar collector panel 100 where the refrigerant vapor is separated and delivered to condensor 180. The condensed liquid refrigerant is delivered to reservoir 184 wherein it is stored for future use. Spray pump 212 and solenoid valve 196 remain dormant during this period. These elements may be controlled by a conventional room thermostat if desired. This constitutes the second mode of operation.

During the third mode of operation, solar insolation is unavailable. However, comfort cooling is needed. This situation occurs typically during the late evening hours of summer. In this mode of operation, spray pump 212 and solenoid valve 196 are activated. The stored liquid refrigerant enters evaporator 200 and effects the cooling of the medium passed over that evaporator. Stored concentrated solution is drawn from reservoir 172 and recombined with the vaporized refrigerant in chamber 206 and stored in reservoir 154 for future use upon the availability of solar radiation.

Figure 4:
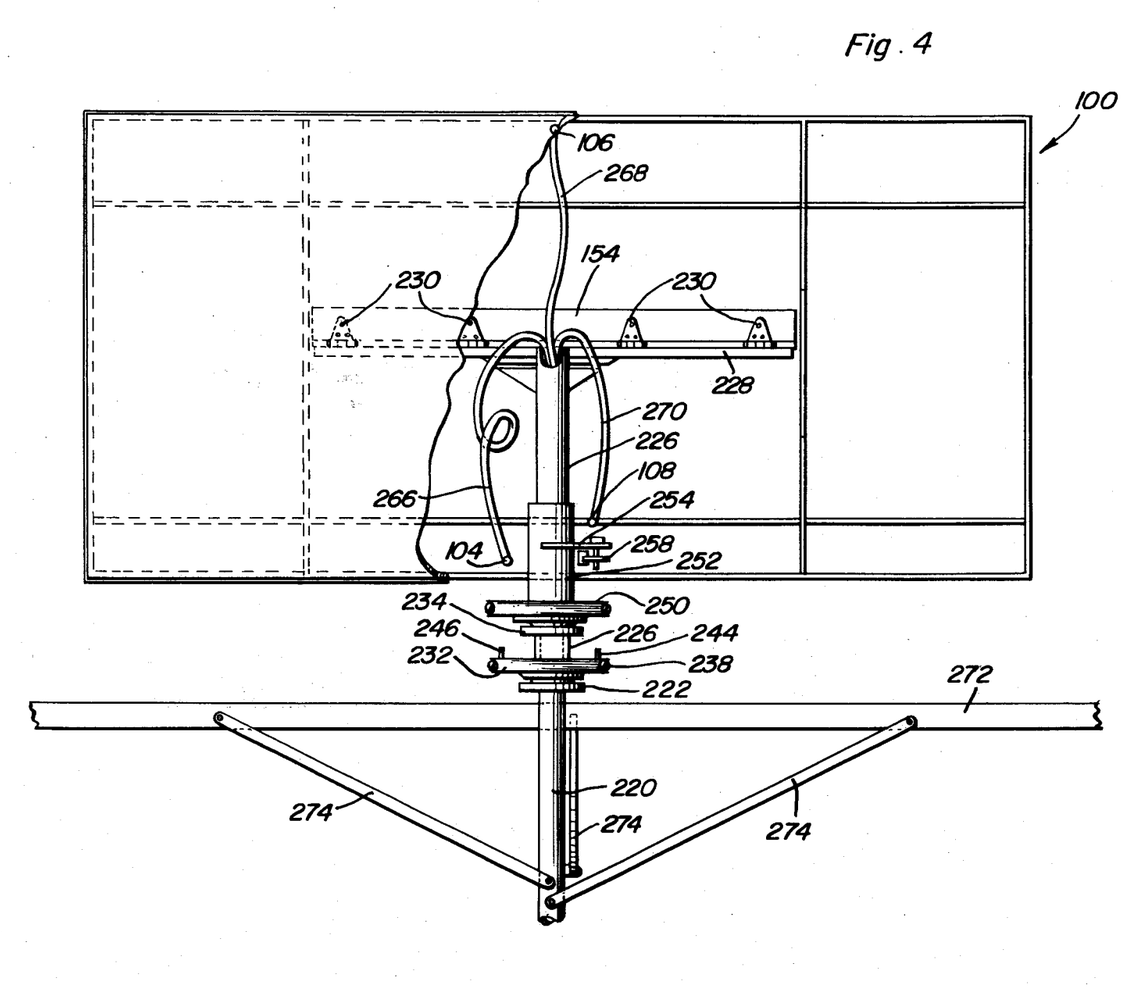
FIG. 4 is a rear view of a solar panel and mounting for allowing solar tracking of the panel.
Figure 5:
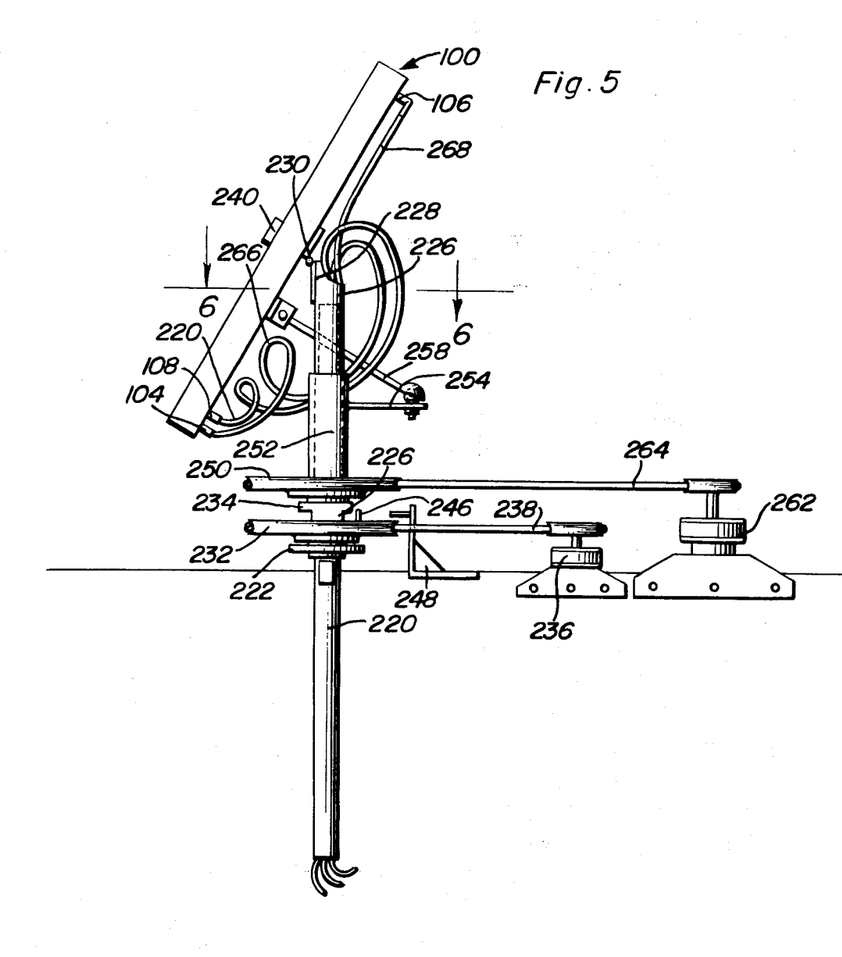
FIG. 5 is a side view of the solar panel and solar tracking mounting, with the solar panel shown schematically.
Figure 6:
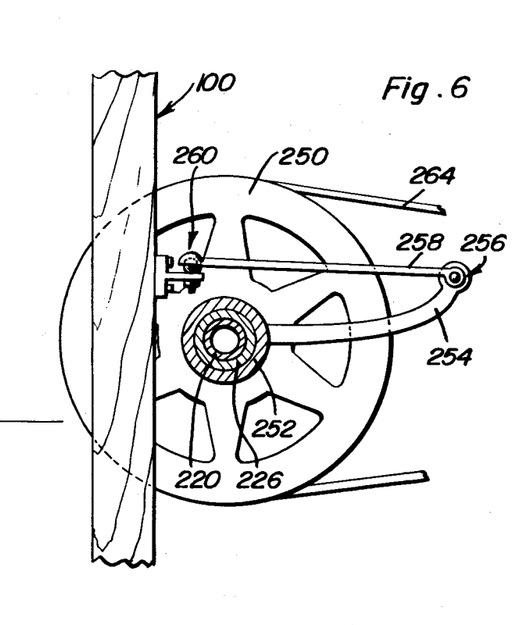
FIG. 6 is a sectional view taken substantially along a plane passing through section line 6—6 of FIG. 5 and showing the mechanical elevation control of the solar tracking mount.
Figures 7, 8:
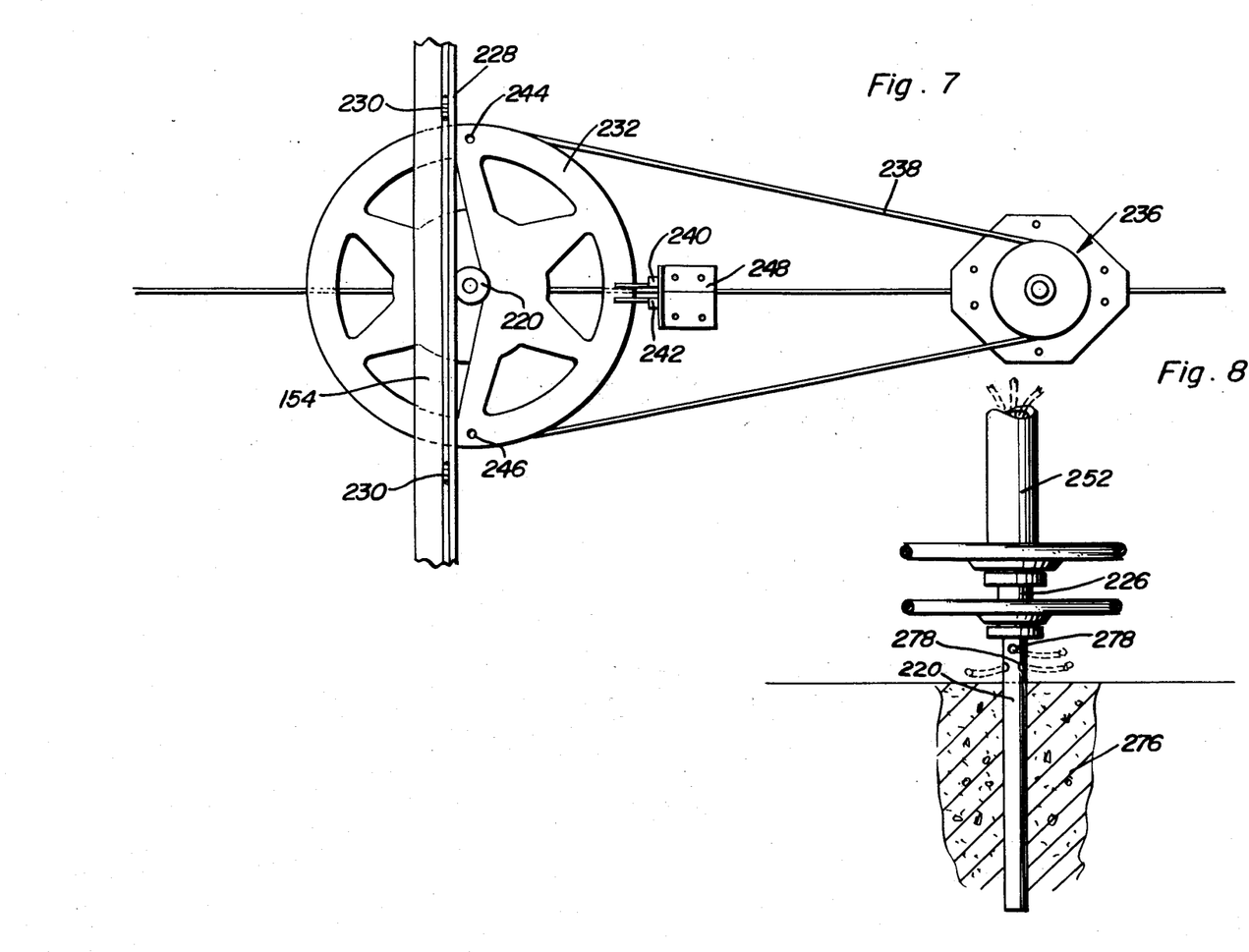
FIG. 7 is a plan view of the mechanical azimuth control of the solar tracking mount.
FIG. 8 is a part section view showing one structure for supporting the solar panel mount.

Now with reference to FIGS. 4 through 7, the solar tracked mechanism of the present invention will be set forth in detail. With reference especially to FIGS. 4 and 5, it will be seen that a main vertical support shaft 220 has attached thereto an annular thrust collar 222. Positioned over the shaft 220 and resting on collar 222 is a tubular panel support shaft 226. Shaft 226 is a hollow tubular shaft having a diameter larger than that of shaft 220. Shaft 226 is allowed rotary motion with respect to shaft 220 by virtue of the support given by thrust collar 222. Mounted to the top of shaft 226 is a horizontal support bar 228 to which is hinged the solar collector panel 100 by hinges 230. In this manner, it will be evident that the solar panel 100 may rotate in a horizontal plane about the vertical axis defined by shaft 220 by virtue of the connection of shaft 226 to shaft 220. The panel may also rotate in a vertical plane about the horizontal axis defined by the connection of hinges 230. Shaft 226 also has attached thereto a pulley 232 and a second thrust collar 234. The pulley is connected to azimuth tracking motor 236 by belt 238. With reference to FIG. 7, it will be seen that motor 236 which is mounted by any suitable means, will drive pulley 232 in either a clockwise or counterclockwise direction until one of the limit switches 240 or 242 is activated by its respective limit stop 244 or 246. Switches 240 and 242 are in the drive circuit for motor 236 and will be effective to stop further rotation of that motor in the appropriate direction. Switches 240 and 242 are mounted by the use of angle brace 248. It will be noted that in FIG. 7 many of the components of the mounting device have been eliminated for clarity.

Referring again to FIGS. 4 and 5, it will be seen that vertical tilt of the solar collector panel is controlled by tilt pully 250 which is connected to tilt control shaft 252 which is positioned about shaft 226 and rests on thrust collar 234. Shaft 252 rotates with respect to shaft 226 in a manner similar to the rotation of shaft 226 with respect to shaft 220. With reference to FIG. 6, it can be seen that shaft 252 has a laterally extending crank arm 254 attached thereto. Crank arm 254 is connected by ball and socket joint 256 to tie rod 258. Tie rod 258 is connected to the solar panel 100 by a second ball and socket joint 260. Upon rotation of pulley 250 as affected by an altitude motor 262 through altitude drive belt 264, tilt control shaft 252 will rotate with the attached crank arm 254, whereupon tie rod 258 will cause solar panel 100 to tilt hinges 230 through the action of ball and socket joints 256 and 260.

Figure 13:
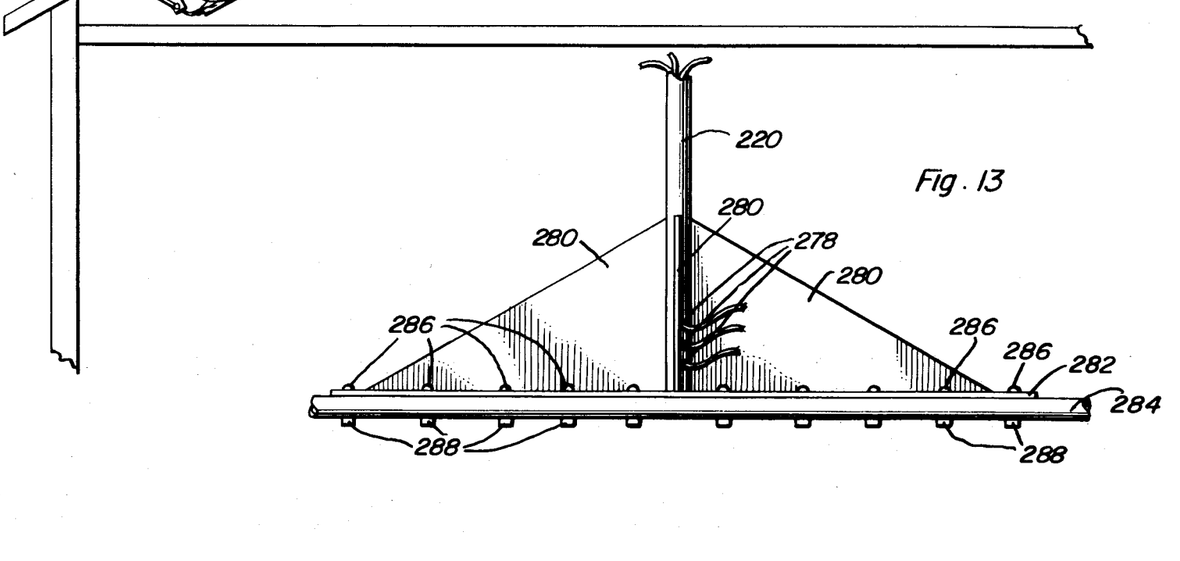
FIG. 13 shows a mounting technique for the solar tracking support for use on flat surfaces.

Again with reference to FIGS. 4 and 5, it can be seen that inlet 104 and outlets 106 and 108 of the solar panel have flexible tubes 266, 268 and 270 connected respectively thereto. With shaft 220 being a hollow tubular member, the tubes 226, 268 and 270 may be positioned within the shaft to protect them from the elements and provide an obstruction free path for these tubes. Support shaft 220 can extend through a roof such as shown at 272 of FIG. 4. The shaft can be supported by appropriate support members 274 which extend from the roof to the lower portion of shaft 220. Alternatively, the shaft 220 may be mounted in the ground as shown in FIG. 8, wherein it will be seen that shaft 220 is supported within a post hole containing concrete 276. Holes 278 may be drilled in shaft 220 for the flexible tubes to exit from. A further alternative for the mounting of shaft 2209 is shown in FIG. 13. Four support gussets 280 are connected to the shaft by means of, for example, welding. The gussets provide rigidity to the shaft and are themselves connected to a common base 282. Holes 278 are also provided for the flexible tubes to exit from. Base 282 is connected to the mounting surface 284 by use of bolts 286 and nuts 288.

Figure 10:
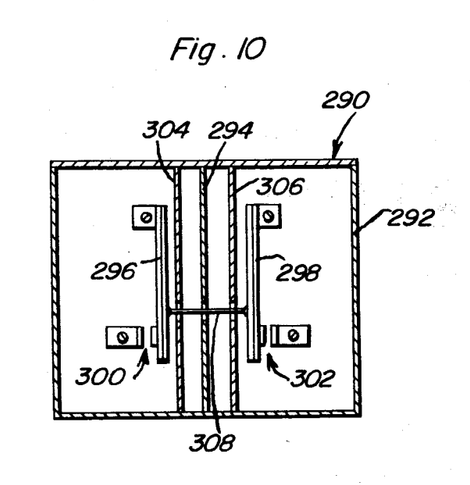
FIG. 10 is a plan view of the solar radiation detection sensor of the present invention.

Mounted on the face of panel 100, as shown in FIG. 5, are a pair of solar sensors 290. The sensors are identical and disposed over and under on the panel face with the orientation of the sensor being perpendicular to each other. In this manner, one sensor serves to control the azimuth motor 236 and the second sensor controls altitude motor 262. For purposes of illustration, one sensor together with a control circuit activated thereby will be described with reference to FIGS. 10 and 11, it being understood that the second sensor and control circuit will be of similar configuration. In FIG. 10, sensor 290 is shown to include an outer housing 292. The housing is divided into two interior compartments by partition 294. The compartments contain bimetal strips 296 and 298. Bimetal strip 296 operates contact 300 while strip 298 operates contacts 302. Shadow walls 304 and 306 are disposed in proximate relation to the bimetal strips 296 and 298, respectively. The shadow walls are configured to be of such a height as to allow the sun's rays to be incident upon each bimetal coil only when the sun is oriented at a desired angle overhead with respect to the strips. If the sun is angled too greatly to one side of a wall, a shadow will be cast upon the bimetal strip associated with that shadow wall. The bimetal strips are mechanically connected by a non-conductive connecting strip 308 which may be, for example, a length of monofilament line glued at its ends to each bimetal strip. Connecting strip 308 insures that only one set of contacts 300 or 302 will be closed at any given time.

In operation, when solar radiation is incident upon one of the bimetal strips, for example, strip 296, that strip bends outwardly thereby allowing contact 300 to engage. Upon a different orientation of the sun, bimetal strip 298 will receive solar radiation, thereby heating the strip and forcing engagement of contacts 302. When the sun's rays are perpendicular to the sensor's face, the solar radiation will strike both bimetal strips 296 and 298 forcing each strip to bend outwardly in opposite directions. This bending is inhibited by connecting strip 308 which prevents either contacts 300 or 302 from engaging.

Figure 11:
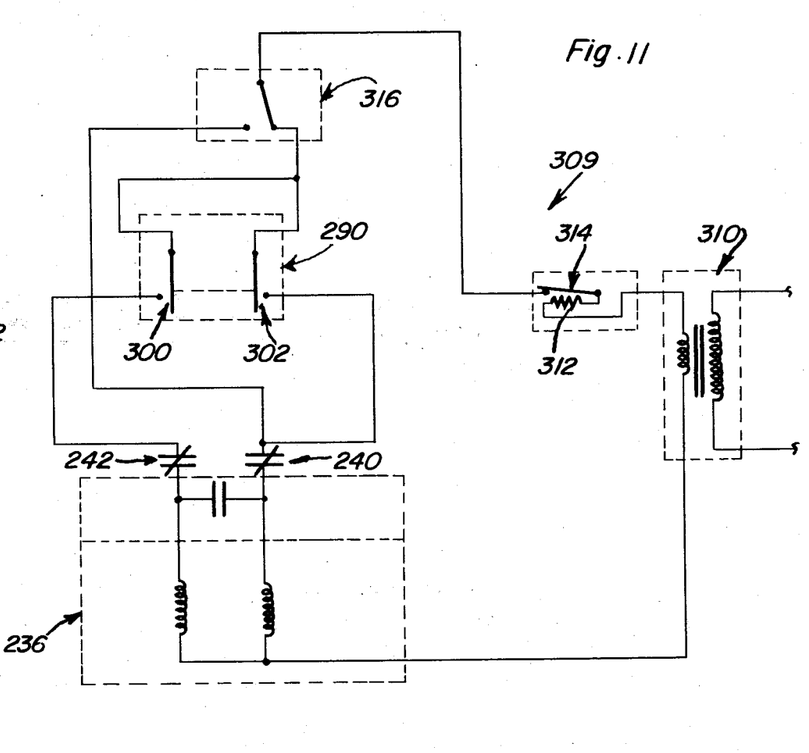
FIG. 11 is a schematic representation of the solar tracking circuit of the present invention.

FIG. 11 shows solar sensor 290 as used in a circuit 309 for controlling azimuth motor 236. The circuit includes transformer 310 through which power is supplied. A resistance heater 312 is connected in series with a bimetal strip 314 and is also placed in physical communication therewith. A photoelectric switch 316 is in series with the bimetal strip 314 and has contacts, one of which is operative to supply power to solar sensors 290, the other contact of which supplies power directly to motor 236. As connected, the contacts of sensor 290 are disposed such that contacts 300 are operative through the contacts of limit switch 242 to rotate motor 236, which is a standard split phase motor, in the direction which will rotate the solar panel from east to west. Contacts 302 are operative through contacts 240 to rotate the motor from west to east.

In operation, during the night, photoelectric sensor 316 is positioned such that power is supplied directly to motor 236 through the contacts of limit switch 240. Current is supplied through transformer 310, resistance heater 312 and bimetal strip 314. In this manner, the motor rotates the solar panel from west to east a small amount until bimetal coil 314 heats up and the contacts connected thereto are biased open. Thereupon the bimetal strip cools down and closes the contacts once more. This procedure continues until the contacts of 240 open indicating that the solar collector is positioned in the appropriate direction to obtain benefit of the sun's rays in the early morning. Upon sunlight being incident upon photocell 316, the cell directs current as shown in FIG. 11 to sensor 290. As discussed above, the contacts 300 or 302 close in response to the sun's rays being incident on their respective bimetal strips. When the sun's rays are perpendicular to the sensor's face, both contacts remain open. When the sun progresses westwardly, contacts 300 close and the solar panel follows the sun's movement. In the event that the panel is moved too far, contacts 302 will close moving the panel slightly eastward again aligning it with the sun. It will be understood that a similar circuit may be used to control altitude motor 262 wherein the sensor 290 for controlling that motor will be oriented perpendicular to sensor 290 of FIG. 11. During the night, the altitude motor may be controlled to move the solar panel in a totally vertical orientation to receive the morning sunlight. Thus, it can easily be seen that a pair of control circuits as disclosed in FIG. 11 may be operative to provide total solar tracking of the solar panel of the instant invention.

Figure 12:
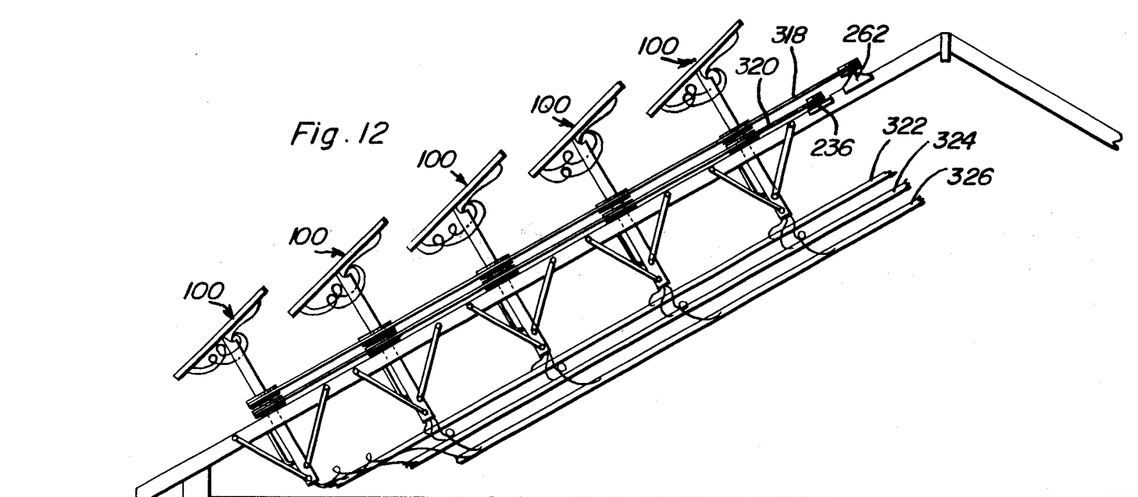
FIG. 12 shows a plurality of solar panels connected to a roof and connected in ganged configuration for solar tracking.
Figure 14:
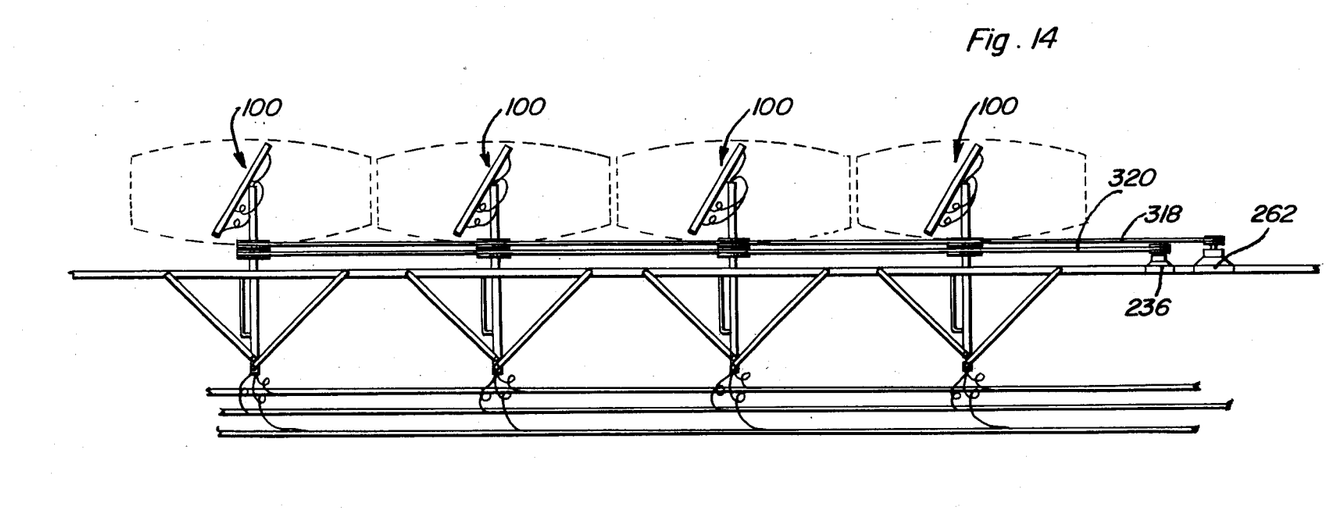
FIG. 14 shows a series of ganged collectors mounted upon a flat surface for solar tracking.

In FIGS. 12 and 14, it will be seen that a single azimuth motor 236 and a single altitude motor 262 may be used to control a plurality of solar panels 100. Each solar panel has a mounting structure identical to that shown in FIG. 4. Ganged operation of panels may be effected by use of belts 318 and 320 which will be wrapped with one loop about each pulley in order to provide for ganged operation of the solar panels. FIG. 12 demonstrates the use of such ganged operation upon the roof of a residential structure. The group of solar panels shown may be used to supply energy to a single cooling system. Each of the respective input and output tubes of each solar panel will enter a respective one of the pipes 322, 324 and 326 wherein 322 represents the input header for providing solution to the panels. Header 324 represents the vapor output header and header 326 represents the concentrated solution outlet header. FIG. 12 shownns that sufficient spacing should be provided between adjacent solar panels to allow for vertical tracking of the panels without fear of interference between the panels. FIG. 14 shows that sufficient spacing should be provided between the panels to allow for horizontal tracking of panels without fear of interference therebetween. It will be noted that depending on the location of the structure on which the panels will be mounted, the spacings may be varied. For instance, FIG. 12 shows a mounting wherein vertical tracking of the sun dominates. Therefore, the panels may be mounted maintaining the distance between panels equal to the panel height. FIG. 14 shows a situation wherein horizontal tracking is dominant and thus the spacing between panels must be adjusted accordingly to the panel width. Of course, as noted above, the size and shape of the panels may be varied, this to insure maximum efficient use of the panels when solar tracking and also to improve the aesthetic appeal of the panels themselves. The aesthetic appeal of the construction is enhanced, as will be noted by reference to FIGS. 12 and 14, by the inclusion of the piping for the inlets and outlets of the panels below the roof line of the structure upon which they are mounted. The structural support braces are also mounted below the roof line in order to produce an uncluttered appearance of the ganged panels.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A solar cooling system comprising: an absorbent solution including a two-phase refrigerant and an absorber, said two-phase refrigerant comprising water; solar collector means for placing the absorbent solution in direction communication with solar radiation for separating refrigerant from the solution; cooling means connected to the solar collector means for utilizing the separated refrigerant to produce evaporative cooling of a working medium; and means for recombining the separated refrigerant and the remaining solution from which it was separated, said solar collector means comprising a first chamber having an inlet for allowing the entry of said absorbent solution, said first chamber having at least one perimetric section composed of a transparent panel for allowing direct communication of solar radiation with said absorbent solution in said first chamber, a second chamber having an outlet therein for allowing said remaining absorbent solution to pass therethrough from said solar collecting means, said second chamber being separated from said first chamber by a partition, and a third chamber in communication with said first and second chambers, said third chamber being disposed vertically above said first and second chambers and including a vapor outlet connected thereto for transferring said separated refrigerant in the vapor state to said cooling means, said solar collector means being maintained at a sub-atmospheric pressure.

2. The solar cooling system of claim 1 wherein said refrigerant comprises blackened distilled water and said absorber comprises lithium bromide.

3. The invention as defined in claim 1 wherein said first chamber includes fluid guide means containing vertically disposed rods attached to said partition for providing a plurality of vertically extending paths for guiding said absorbent solution between said first chamber inlet and said third chamber.

4. The invention as defined in claim 3 wherein said second chamber contains second fluid guide means comprising a plurality of vertically extending rods connected to said partition for providing a plurality of vertically extending paths for guiding a solution between said third chamber and the outlet of said second chamber.

5. The system of claim 1 including means for determining the refrigerant content of the remaining solution, means for returning the remaining solution to the solar collector means if the refrigerant content is above a predetermined level, and means for transporting the remaining solution to a storage tank if the refrigerant content is below a predetermined level.

6. The system of claim 5 wherein said means for determining includes a temperature responsive element which measures the temperature of the remaining solution.

7. The system of claim 6 wherein said means for transporting includes a valve operated by said means for determining.

8. The system of claim 1 and further including a means for storing said separated refrigerant connected between said vapor outlet and said cooling means, and a valve means connected between said means for storing and said cooling means for allowing selective storage or use of said separated refrigerant.

9. The system of claim 1 wherein said means for recombining includes an absorption chamber having a spray means contained therein and connected to a source of remaining solution, said absorption chamber also being connected to a source of separated refrigerant, said remaining solution and said separated refrigerant being combined in said absorption chamber and conveyed to a storage tank.

10. The system of claim 1 including a refrigerant storage means connected to the solar collector means and the cooling means, a selectively actuatable valve means being connected between said refrigerant storage means and said cooling means for selectively allowing the entry of refrigerant to said cooling means; a remaining solution storage means being connected between said solar collector means and said means for recombining, a selectively actuatable remaining solution valve means being connected between said remaining solution storage means and said means for combining; an absorbent solution storage means being connected between said means for combining and said solar collector means.

* * * * *